US012771227B2

(12) United States Patent
Vaananen et al.

(10) Patent No.: US 12,771,227 B2
(45) Date of Patent: Oct. 20, 2026

(54) DROOP COMPENSATION FOR CURRENT MODE VOLTAGE CONVERTER

(71) Applicant: TEXAS INSTRUMENTS INCORPORATED, Dallas, TX (US)

(72) Inventors: Ari Vaananen, Oulu (FI); Janne Pahkala, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 124 days.

(21) Appl. No.: 18/308,042

(22) Filed: Apr. 27, 2023

(65) Prior Publication Data

US 2024/0364204 A1 Oct. 31, 2024

(51) Int. Cl.

| | |
|---|---|
| ***H02M 3/158*** | (2006.01) |
| ***H02M 1/00*** | (2007.01) |
| ***H02M 3/156*** | (2006.01) |

(52) U.S. Cl.

CPC ....... *H02M 1/0045* (2021.05); *H02M 1/0003* (2021.05); *H02M 3/158* (2013.01)

(58) Field of Classification Search

CPC .. H02M 3/1566; H02M 1/0025; H02M 1/158; H02M 1/0045; H02M 1/0003

See application file for complete search history.

(56) References Cited

U.S. PATENT DOCUMENTS

| | | | | |
|---|---|---|---|---|
| 7,863,875 B1 * | 1/2011 | Guo | H02M 3/1584 323/275 |
| 9,891,643 B2 * | 2/2018 | El-Nozahi | G05F 1/56 |
| 10,250,128 B2 * | 4/2019 | Unno | H02M 3/04 |
| 2006/0139015 A1 * | 6/2006 | Dinh | H02M 3/1584 323/272 |
| 2014/0084887 A1 * | 3/2014 | Sahu | H02M 3/158 323/283 |
| 2017/0322575 A1 * | 11/2017 | Du | G05F 1/575 |
| 2019/0302818 A1 * | 10/2019 | Liu | H02M 3/156 |
| 2022/0350354 A1 * | 11/2022 | D'Souza | G05F 1/56 |
| 2023/0299675 A1 * | 9/2023 | Xu | H02M 1/0025 323/271 |
| 2025/0158603 A1 * | 5/2025 | Sharma | H03K 17/56 |

FOREIGN PATENT DOCUMENTS

| | | | |
|---|---|---|---|
| CN | 108336895 A * | 7/2018 | H02M 1/088 |

* cited by examiner

*Primary Examiner* — Sisay G Tiku
(74) *Attorney, Agent, or Firm* — Charles F. Koch

(57) ABSTRACT

A voltage regulator includes a transconductance amplifier having an input and an output. The input is coupled to a voltage regulator output. A droop compensation circuit is coupled to the output of the transconductance amplifier. The droop compensation circuit includes a voltage source circuit configured to cause a voltage at an output of the voltage regulator to change from a first voltage level to a second voltage level in response to a first change in a load condition and remain at the second voltage level until a second change in the load condition. The droop compensation circuit also is configured to cause the voltage at the output of the voltage regulator to change from the second voltage level back to the first voltage level in response to the second change in the load condition.

21 Claims, 5 Drawing Sheets

DROOP COMPENSATION FOR CURRENT MODE VOLTAGE CONVERTER

BACKGROUND

A current mode voltage converter controls the current delivered by the converter to a load to regulate the output voltage to the load. In lighter load conditions (e.g., the load draws less current), the converter causes its output current to decrease. Conversely, in heavier load conditions (e.g., the load draws more current), the converter causes its output current to increase. The converter responds to changes in load condition by causing corresponding changes in the magnitude of the current it provides to the load. For some current mode voltage converters, a change in load condition (e.g., the load transitions from a sleep state (light load condition) to a fully operational state (e.g., heavy load condition), or vice versa), the sudden change in load condition may result in a transient in the output voltage from the converter. For example, responsive to a change in load condition from a light load condition to a heavy load condition, the converter's output voltage may experience a temporary downward transient in which the output voltage decreases and then recovers back to its original level (also referred to as an undershoot), and responsive to a change in load condition from a heavy load condition to a light load condition, the converter's output voltage may experience a temporary upward transient in which the output voltage increases and then recovers back to its original level (also referred to as an overshoot).

SUMMARY

A voltage regulator includes a transconductance amplifier having an input and an output. The input is coupled to a voltage regulator output. A droop compensation circuit is coupled to the output of the transconductance amplifier. The droop compensation circuit includes a voltage source circuit configured to cause a voltage at an output of the voltage regulator to change from a first voltage level to a second voltage level in response to a first change in a load condition and remain at the second voltage level until a second change in the load condition. The droop compensation circuit also is configured to cause the voltage at the output of the voltage regulator to change from the second voltage level back to the first voltage level in response to the second change in the load condition.

DETAILED DESCRIPTION

Figure 1:
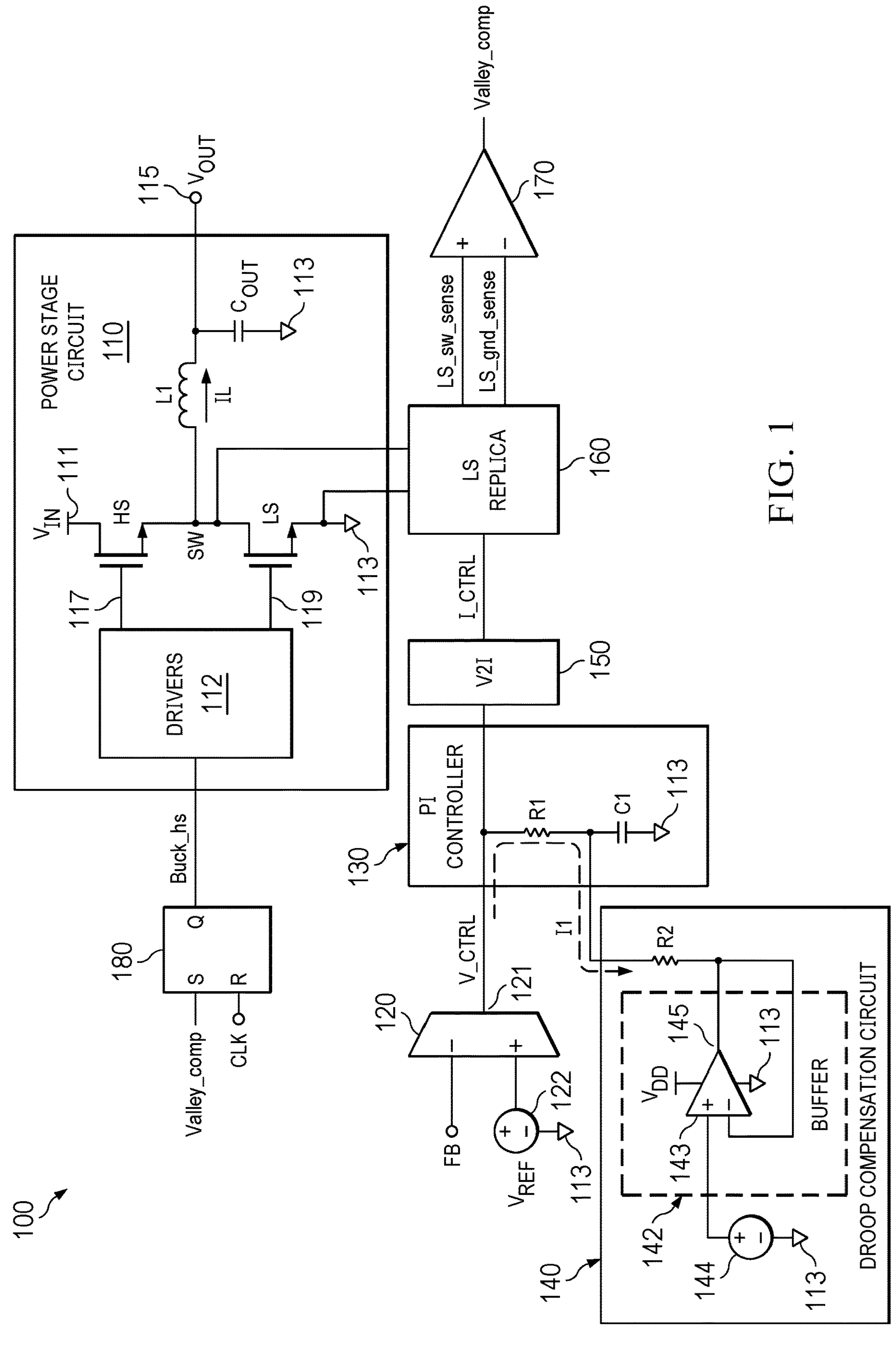
FIG. 1 is a circuit schematic of a voltage converter including a droop compensation circuit, in accordance with an example.

The same reference numbers or other reference designators are used in the drawings to designate the same or similar (either by function and/or structure) features.

FIG. 1 is a schematic diagram of an example current mode voltage converter 100 that includes a droop compensation circuit 140 that causes the output voltage $V_{OUT}$ from the converter 100 to decrease (droop) from a higher voltage level to a lower voltage level (e.g., a decrease from 760 mV to 740 mV) in response to a change in load condition from lighter to heavier and remain at the lower voltage level (e.g., 740 mV) until a subsequent change in the load condition back to the lighter load condition. Responsive to the subsequent change in load condition back to the lighter load condition, the converter 100 causes the converter's output voltage $V_{OUT}$ to increase back to the higher voltage level (e.g., 760 mV). By causing the converter's output voltage to droop while the load condition is at the higher load condition level, the output voltage transients described above are advantageously reduced or eliminated, particularly the output voltage overshoot as the load condition transitions back to the lighter load condition.

Although two load conditions are depicted in FIG. 1, more than two load conditions are possible. References herein to a lighter load condition and a heavier load condition refer to two load conditions in which one load condition is heavier than the other.

The example converter 100 in FIG. 1 includes a power stage 110, a transconductance amplifier 120, a proportional integral (PI) controller 130, the droop compensation circuit 140, a voltage-to-current (V2I) converter 150, a low side (LS) replica circuit 160, a comparator 170, and a set-reset (SR) latch 180. Power stage 110 includes drivers 112, a high side (HS) transistor, a low side (LS) transistor, an inductor L1, and an output capacitor $C_{OUT}$. In this example, the HS and LS transistors are n-channel field effect transistors (NFETs). The HS transistor and LS transistor are coupled in series between an input voltage terminal 111 and a reference supply terminal 113 (e.g., ground). The connection between the HS and LS transistors is the switch node (SW). One terminal of inductor L1 is coupled to the SW node. The output capacitor $C_{OUT}$ is coupled between the opposing terminal of inductor L1 and the reference supply terminal 113. The voltage across the capacitor $C_{OUT}$ is the output voltage $V_{OUT}$ produced by the converter 100. The output voltage $V_{OUT}$ is provided at a voltage output terminal 115 of the converter 100 which may be coupled to a load (not shown). Drivers 112 receive a control signal Buck_hs from the Q output of the SR latch 180 and produce gate signals 117 and 119 to the HS and LS transistors, respectively, to turn on and off the transistors. The converter 100 in this example is a buck converter, but the droop compensation circuit 140 can be applied to other types of current mode converters (e.g., boost converters, buck boost converters, etc.).

The transconductance amplifier 120 has a negative (−) input, a positive (+) input, and an output 121. The voltage output terminal 115 from the converter 100 may be coupled to one of the inputs of the transconductance amplifier 120. The signal provided to the negative input of the transconductance amplifier 120 is a feedback (FB) signal. In one example, the voltage output terminal 115 may be coupled to the negative input of the transconductance amplifier 120, and, as such, the signal FB is the output voltage $V_{OUT}$. In another example, the output voltage $V_{OUT}$ may be provided to a resistor divider, which divides down the output voltage to provide the signal FB to the negative input of the transconductance amplifier 120. The positive input of the transconductance amplifier 120 is coupled to a voltage source circuit 122, which provides a reference voltage, $V_{REF}$, to the positive input of the transconductance amplifier.

The output 121 of the transconductance amplifier 120 is coupled to the PI controller 130 and to an input of the V2I converter 150. The output of the V2I converter 150 is coupled to an input of the LS replica circuit 160. The LS replica circuit 160 includes one or more NFETs that are smaller than the LS transistor. The LS replica circuit 160 produces LS_sw_sense and LS_gnd_sense signals to comparator 170. The output signal from comparator 170 is a valley_comp signal. Converter 100 implements valley current control of the current $I_L$ through inductor L1. Other examples of converters within the scope of this disclosure may implement peak current control, average current control, or other types of current control techniques.

The output of comparator 170 is coupled to a set (S) input of SR latch 180. The reset (R) input of SR latch 180 is coupled to a clock circuit and thus receives a clock signal CLK. The Q output of SR latch 180 provides the Buck_hs control signal and is coupled to an input of drivers 112.

The transconductance amplifier 120 produces an output current that is a function of the difference between the signal FB and the reference voltage $V_{REF}$. The PI controller 130 includes a resistor R1 coupled in series with a capacitor C1 between the output 121 of the transconductance amplifier and the reference supply terminal 113. Ignoring, for the time being, droop compensation circuit 140, the current from the transconductance amplifier 120 flows through resistor R1 to charge capacitor C1. Upon signal FB settling to the reference voltage $V_{REF}$, the current from the transconductance amplifier 120 ceases, and the voltage across the capacitor C1 and at the output 121 of the transconductance amplifier is voltage V_CTRL.

The V2I converter 150 converts voltage V_CTRL to a current I_CTRL. The LS replica circuit 160 transforms the I_CTRL current to a voltage signal so that the resistance variation of the LS transistor (e.g., due to gate driver voltage variations, temperature variations, process tolerances, etc.) can adjust the magnitude of control signals LS_sw_sense and LS_gnd_sense. The LS_sw_sense signal has the voltage information taken from the drain of the LS FET, and the voltage on the drain of the LS transistor is a function of inductor current L1. As noted above, the LS replica circuit 160 may include a scaled-down version of the LS transistor, which is used as resistive element to transform the I_CTRL to a suitable voltage signal. Comparator 170 forces the valley_comp signal to a logic high level in response to the LS_sw_sense signal being higher than the LS_gnd_sense signal, and logic low otherwise. The valley_comp signal (provided to the S input of SR latch 180) being logic high sets SR latch 180 thereby forcing its Q output signal Buck_hs logic high. Drivers 112 respond to a logic high assertion of the Buck_hs signal by turning on the HS transistor and turning off the LS transistor (with a small amount of dead-time to ensure both transistors are not on at the same time). A logic high assertion of the clock signal CLK to the R input of SR latch 180 resets the SR latch causing the Buck_hs signal to a logic low state. Drivers 112 respond to a logic low assertion of the Buck_hs signal by turning off the HS transistor and, with after a dead time, turning on the LS transistor.

Figure 2:
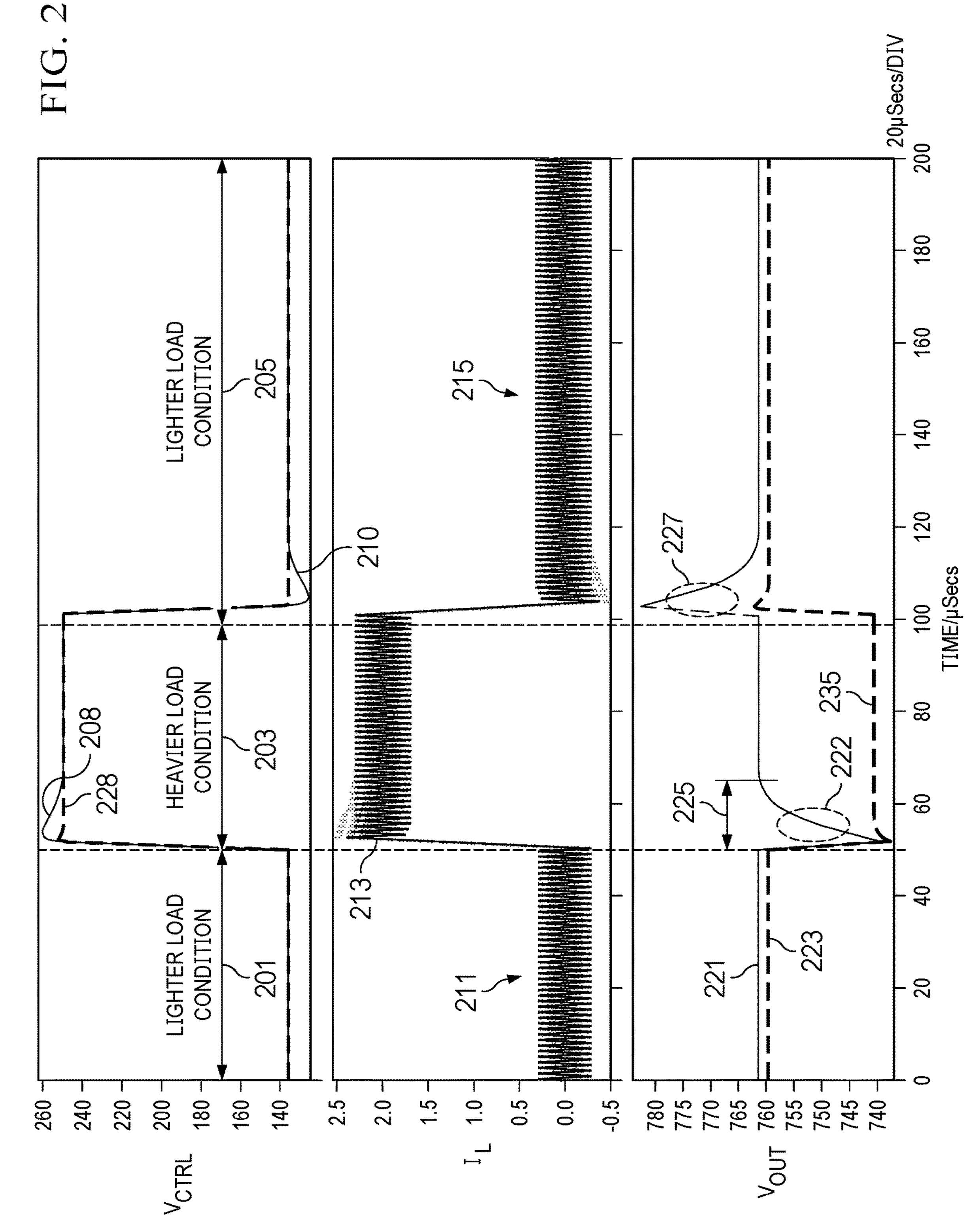
FIG. 2 are graphs illustrating example voltages and currents within the voltage converter of FIG. 1.

FIG. 2 includes graphs of voltage V_CTRL, inductor current $I_L$, and the converter's output voltage $V_{OUT}$ for a lighter load condition 201 followed by a transition to a heavier load condition 203, and then followed by a transition back to a lighter load condition 205. For the lighter load conditions 201 and 205, the current to a load driven by the converter 100 is lower than the current to the load for the higher load condition 203. During the lighter load conditions 201 and 205, the inductor current $I_L$ is lower (see reference numerals 211 and 215) than for the heavier load condition 203 (see reference numeral 213).

FIG. 2 includes two graphs 221 and 223 for the output voltage $V_{OUT}$. Graph 221 represents the output voltage $V_{OUT}$ assuming the droop compensation circuit 140 is not present and thus the converter 100 does not implement droop compensation. Graph 223 represents the output voltage $V_{OUT}$ with the benefit of the droop compensation circuit 140.

Referring to FIGS. 1 and 2, without the benefit of the droop compensation circuit 140, as the load condition on the converter 100 changes from the lighter load condition 201 to the heavier load condition 203, the output voltage $V_{OUT}$ drops from its target level 219 of 760 mV in this example, and then quickly recovers as shown by the transient 222. Transient 222 results from the load current remaining at a lower level upon the initial transition to the heavier load condition, which causes the output voltage to decrease. As the output voltage $V_{OUT}$ decreases, the signal FB decreases, which causes the transconductance amplifier 120 to increase its output current. An increase in the output current from the transconductance amplifier 120 charges the capacitor C1 within the PI controller 130 to a higher voltage. Accordingly, the magnitude of voltage V_CTRL increases as indicated at 208. An increase in the magnitude of the voltage V_CTRL causes the timing of the Buck_hs signal to change such that the drivers 112 turn on the HS transistor for a longer period of time during each switching cycle (higher duty cycle) thereby causing an increase in the inductor current IL. The output voltage $V_{OUT}$ responds by increasing due to an increase in the inductor current IL. The time duration 225 of transient 222 is a function the bandwidth response of the converter 100.

Another transient (overshoot) 227 occurs upon the change in the load condition from the higher load condition 203 to the lower load condition 205. The inductor current IL temporarily remains at the higher level which causes the upward increase in the output voltage $V_{OUT}$. The increase in the output voltage causes the capacitor C1 to at least partially discharge thereby causing a decrease in the magnitude of voltage V_CTRL as indicated at 210. A lower magnitude of voltage V_CTRL causes the timing of the Buck_hs signal to change such that the drivers 112 turn on the HS transistor for a shorter period of time during each switching cycle thereby causing a decrease in the inductor current IL, which in turn causes a decrease in the output voltage $V_{OUT}$.

The droop compensation circuit 140 helps to avoid the transients 222 and 227 upon the lighter-to-heavier load condition change and the heavier-to-lighter load condition change, respectively. In the example of FIG. 1, the droop compensation circuit 140 is coupled to the output of the transconductance amplifier 120 through resistor R1 of the PI controller 130. The droop compensation circuit 140 in this example includes a buffer 142, a voltage source circuit 144, and a resistor R2. The buffer 142 includes an operational amplifier having a positive (+) input, a negative (−) input, and an output 145. The positive input of the operational amplifier 143 is the input of buffer 142, and output 145 is the output of buffer 142. The output 145 is coupled to the negative input. The voltage source circuit 144 is coupled between positive input and the reference supply terminal 113. The operational amplifier 143 has power terminals coupled to VDD and the reference supply terminal 113. The buffer 142 is configured to have unity gain and, accordingly, the voltage on the output 145 of buffer 142 is the same voltage as the voltage from the voltage source circuit 144. Resistor R2 is coupled to resistor R1 and capacitor C1 of the PI controller 130. Resistor R2 is coupled in series with resistor R1 between the output 121 of the transconductance amplifier 121 and the output 145 of buffer 142. In some examples, the voltage provided by voltage source circuit 144 may be approximately equal to the voltage magnitude of voltage V_CTRL when the load current is 0 A. In one example, the voltage provided by voltage source circuit 144 is 0.6V.

With the inclusion of the droop compensation circuit 140, in response to a change from a lighter load condition 201 to a heavier load condition 203, voltage V_CTRL increases as shown at 228, but the voltage at the output 145 of buffer 142 remains at the fixed voltage level equal to the voltage of the voltage source circuit 144. Accordingly, a potential difference develops across the series combination of resistors R1 and R2, and thus a current I1 flows from the output 121 of the transconductance amplifier 120, through resistors R1 and R2, and through buffer 142 to the reference supply terminal 113. The current I1 represents an increase in the output current from the transconductance amplifier 120. The transconductance amplifier 120 is the source of current I1. The output current I1 from the transconductance amplifier 120 is a function of the difference between the voltages on its positive and negative inputs. The voltage on the positive input of the transconductance amplifier 120 is a fixed voltage, $V_{REF}$ from voltage source circuit 122. In the steady state, the voltage on the negative input, the FB signal, is forced to decrease so that the transconductance amplifier 120 can supply the increased current I1. The FB signal is, or is derived from, the output voltage, $V_{OUT}$, and thus output voltage $V_{OUT}$ is forced to decrease as shown at 235 in FIG. 2. The series combination of resistors R1 and R2 provides a current path for current I1 as long as the heavier load condition 203 persists. Accordingly, current I1 continues to flow from the output 121 of the transconductance amplifier 120 during the heavier load condition, and the negative input of the transconductance amplifier 120 forces the output voltage $V_{OUT}$ to droop and remain at the lower voltage level 235 (e.g., 740 mV), thereby avoiding output voltage $V_{OUT}$ decreasing and then returning back to the target level 219 (e.g., 760 mV) during the heavier load condition 203 that would otherwise have occurred (transient 222) without the droop compensation circuit 140. The droop in the output voltage $V_{OUT}$ may be approximately the same amplitude as the peak excursion of the negative transient 222, but the output voltage $V_{OUT}$ remains at the lower level 235 rather than quickly recovering back to the target level 219 (e.g., 760 mV). When the load condition changes back to the lighter load condition 205 from the heavier load condition 203, the output voltage $V_{OUT}$ increases from the lower level 235 back to the target level 219 while avoiding the large overshoot 227.

Figure 3:
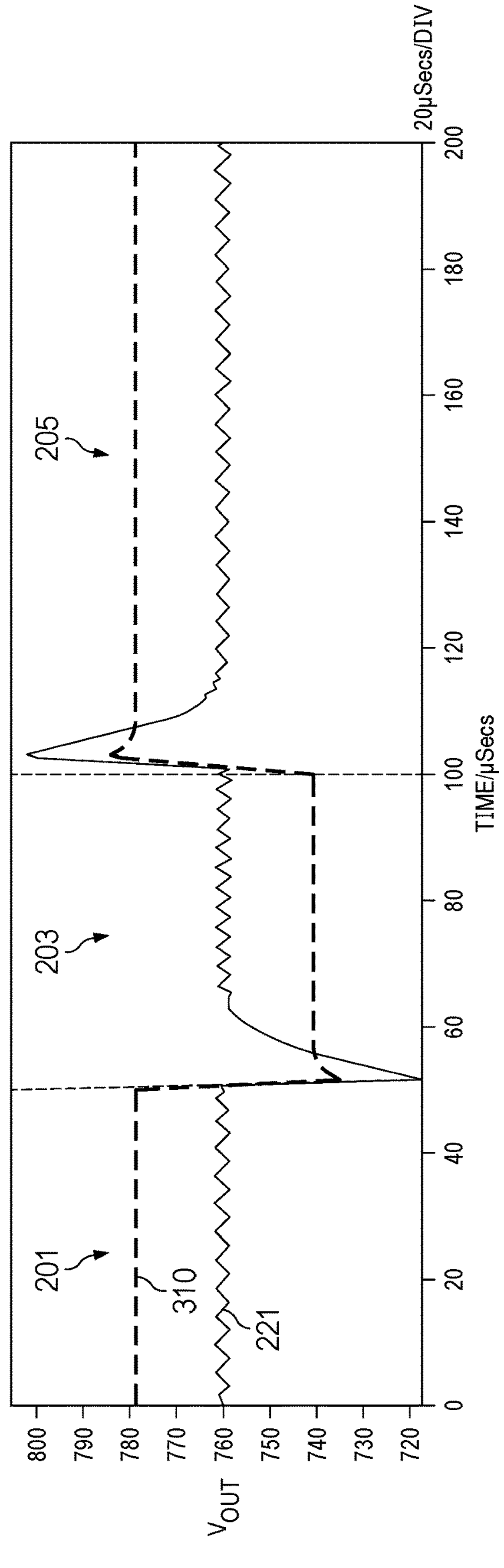
FIG. 3 are additional graphs of the output voltage of the voltage converter with and without droop compensation, in accordance with an example.

FIG. 3 is a graph of the output voltage $V_{OUT}$ without droop compensation (graph 221, repeated from FIG. 2) and with droop compensation, graph 310, in accordance with an example. Graph 310 is the same as graph 221 from FIG. 2 except graph 310 is shifted upward by about 20 mV. The DC upward shift in graph 310 can be implemented by increasing the voltage $V_{REF}$ of the voltage source circuit 124. The maximum to minimum difference for graph 310 is the same (40 mV) as for graph 221 in this example. However, the upward and downward deviation from the target output voltage 219 of 760 mV is less (+/−20 mV for graph 310 and −40 mV for graph 221).

Figure 4:
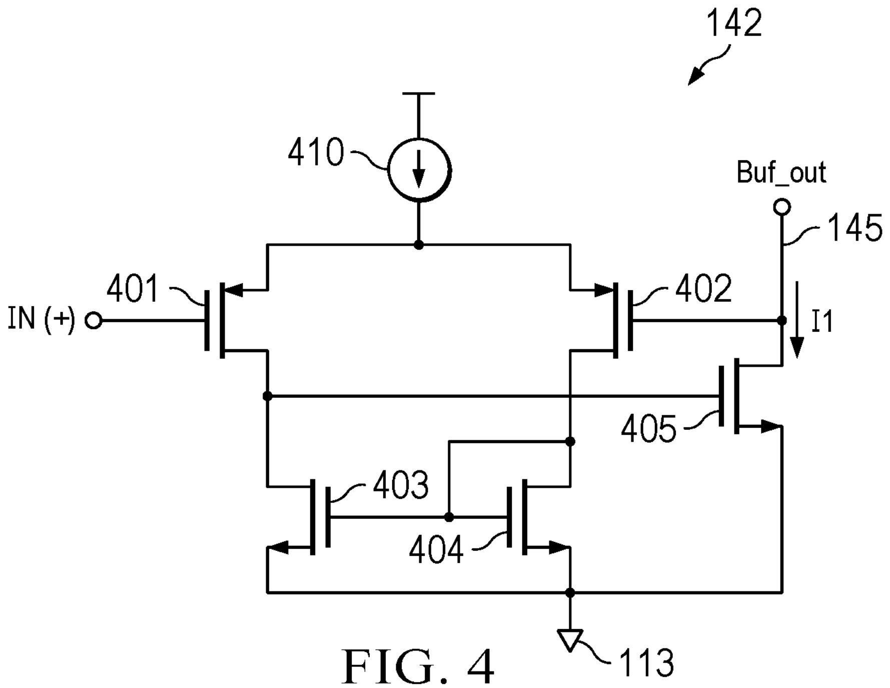
FIG. 4 is a circuit schematic of an example buffer usable within the droop compensation circuit of FIG. 1.

FIG. 4 is a circuit schematic of an example buffer 142. Buffer 142 in this example includes p-channel field effect transistors (PFETs) 401 and 402 and n-channel field effect transistors (NFETs) 403, 404, and 405. A current source circuit 410 provides the bias current for the buffer 142. The sources of PFETs 401 and 402 are coupled together and to the current source circuit 410. The gate of PFET 401 is coupled to the buffer's positive input. The gate of PFET 402 is coupled to the drain of NFET 405 and to the buffer's output 145. The drains of PFET 401 and NFET 403 are coupled together and to the gate of NFET 405. The drains of PFET 402 and NFET 404 are coupled together and to the gates of NFETs 403 and 404. The sources of NFETs 403-405 are coupled together and to the reference supply terminal 113. When current I1 flows, as described above, current I1 flows through NFET 405 to the reference supply terminal 113. Buffer 142 sinks current I1. Buffer 142 does not source current through its output 145.

Figure 5:
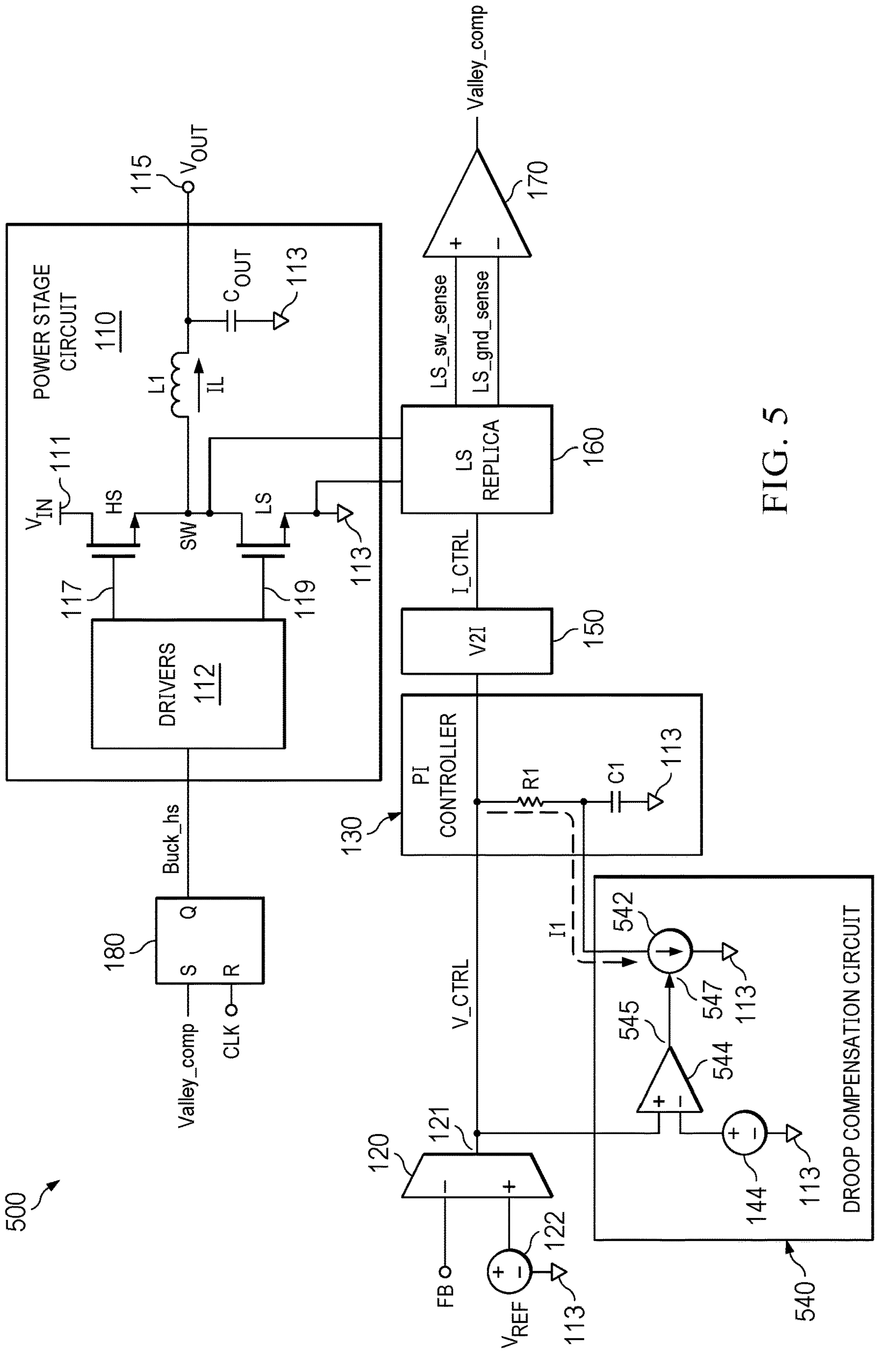
FIG. 5 is a circuit schematic of a voltage converter including a droop compensation circuit, in accordance with another example.

FIG. 5 is a schematic diagram of a converter 500 with a different type of droop compensation circuit 540 coupled to the output 121 of the transconductance amplifier 120. In this example, droop compensation circuit 540 includes the voltage source circuit 144, an amplifier 544, and a voltage-controlled current source 542. The voltage-controlled current source 542 is coupled between the output 121 of the transconductance amplifier 120 (e.g., via resistor R1 of PI controller 130) and the reference supply terminal 113. The voltage-controlled current source 542 provides a current path for current I1 responsive to the magnitude of voltage V_CTRL being larger the voltage from the voltage source circuit 144. Amplifier 544 includes a positive input coupled to output 121 of the transconductance amplifier 120 and a negative input coupled to the voltage source circuit 144. Amplifier 544 amplifies the difference between voltage V_CTRL and the voltage from the voltage source circuit 144 to produce an output control voltage 545 to a control input 547 of the voltage-controlled current source 542. The output control voltage 545 causes the voltage-controlled current source 542 to sink the current I1 from the transconductance amplifier 120.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

The invention claimed is:

1. A voltage regulator, comprising:

a power converter having a control input and a power output; and a control circuit having a feedback input, a reference input, and a control output, the feedback input coupled to the power output, the control output coupled to the control input, the control circuit including an amplifier and configurable to:

provide a control signal to set a first voltage at the power output responsive to a second voltage at the reference input; and responsive to the first voltage dropping to or below a value, provide the control signal to cause the first voltage to stay at the value.

2. The voltage regulator of claim 1, wherein the amplifier is a transconductance amplifier having an input coupled to the power output and an output, and the control circuit includes:

a transconductance amplifier having an input and an output, the input coupled to the power output;

a proportional integral (PI) controller having a first terminal coupled to the output of the transconductance amplifier, and having a second terminal;

a control generation circuit coupled between the output of the PI controller and the control output of the control circuit; and a droop compensation circuit having a terminal coupled to a reference supply terminal, the droop compensation circuit including a second amplifier having an input and an output, the input of the second amplifier coupled to a voltage source terminal, the output of the second amplifier coupled to the second terminal of the PI controller, and the PI controller includes a resistor coupled in series with a capacitor between the output of the transconductance amplifier and the reference supply terminal.

3. The voltage regulator of claim 2, wherein the resistor is a first resistor having a terminal, and the droop compensation circuit includes a second resistor having first and second terminals, the first terminal of the second resistor coupled to the terminal of the first resistor and to a terminal of the capacitor, the second terminal of the second resistor coupled to the output of the second amplifier.

4. The voltage regulator of claim 3, wherein the second amplifier has a second input coupled to the output of the second amplifier and to the second terminal of the second resistor, and the second amplifier has a terminal coupled to the reference supply terminal.

5. The voltage regulator of claim 2, wherein the droop compensation circuit includes a current source circuit having first, second, and third terminals, the first terminal of the current source circuit coupled to a terminal of the resistor and to a terminal of the capacitor, the second terminal of the current source circuit coupled to the output of the second amplifier, the third terminal of the current source circuit coupled to the reference supply terminal, and the second amplifier has a second input coupled to the output of the transconductance amplifier.

6. The voltage regulator of claim 2, wherein the droop compensation circuit includes a voltage source circuit coupled to the voltage source terminal.

7. A voltage regulator, comprising:
- a transconductance amplifier having an input and an output, the input coupled to a voltage regulator output;
- a resistor having first and second terminals, the first terminal coupled to the output of the transconductance amplifier;
- a capacitor having first and second terminals, the first terminal coupled to the second terminal of the resistor, the second terminal coupled to a reference supply terminal; and
- a droop compensation circuit having a first terminal coupled to the second terminal of the resistor and a second terminal coupled to the reference supply terminal, the droop compensation circuit capable of sinking a current from the output of the transconductance amplifier to the reference supply terminal.

8. The voltage regulator of claim 7, wherein the resistor is a first resistor, and wherein the droop compensation circuit includes a second resistor coupled to the first resistor and the capacitor.

9. The voltage regulator of claim 8, wherein the droop compensation circuit further includes:
- a buffer having an input and an output, the second resistor coupled between the first resistor and the output of the buffer; and
- a voltage source circuit coupled to the input of the buffer.

10. The voltage regulator of claim 9, wherein the buffer is a unity gain buffer having a second input coupled to output of the buffer.

11. The voltage regulator of claim 7, wherein the droop compensation circuit includes a current source circuit having the first terminal coupled to the second terminal of the resistor and having the second terminal coupled to the reference supply terminal, the current source circuit capable of sinking the current from the output of the transconductance amplifier to the reference supply terminal.

12. The voltage regulator of claim 11, the current source circuit has a control input, and the voltage regulator further includes a second amplifier having first and second inputs and an output, the first input coupled to the output of the transconductance amplifier, the second input coupled to a voltage source circuit, and the output of the second amplifier coupled to the control input.

13. A voltage regulator, comprising:
- a power stage circuit having an output;
- a transconductance amplifier having an input and an output, the input coupled to the output of the power stage circuit;
- a proportional integral (PI) controller coupled to the output of the transconductance amplifier, the PI controller including a first resistor;
- a buffer having an input and an output; and
- a second resistor coupled between the first resistor and the output of the buffer.

14. The voltage regulator of claim 13, further comprising a voltage source circuit coupled to the input of the buffer.

15. The voltage regulator of claim 13, wherein the buffer is a unity gain buffer.

16. The voltage regulator of claim 13, wherein the PI controller includes a capacitor coupled in series with the first resistor, and wherein the second resistor is coupled to the first resistor and the capacitor.

17. The voltage regulator of claim 13, wherein the voltage regulator is a current mode voltage regulator.

18. A voltage regulator comprising:
- a first transistor having first and second terminals and a control terminal, the first terminal coupled to an input voltage terminal;
- a second transistor having first and second terminals and a control terminal, the first terminal coupled to a reference supply terminal, the second terminal coupled to the second terminal of the first transistor;
- an inductor having first and second terminals, the first terminal coupled to the second terminals of the first and second transistors, the second terminal coupled to an output voltage terminal;
- a first capacitor having first and second terminals, the first terminal coupled to the second terminal of the inductor and to the output voltage terminal, the second terminal coupled to the reference supply terminal;
- driver circuitry having an input and outputs, the outputs coupled to the control terminals of the first and second transistors;
- a transconductance amplifier having a reference input, a second input, and an output, the second input coupled to the output voltage terminal;
- a first resistor having first and second terminals, the first terminal coupled to the output of the transconductance amplifier;
- a second capacitor having first and second terminals, the first terminal coupled to the reference supply terminal, the second terminal coupled to the second terminal of the first resistor;
- a second resistor having first and second terminals, the first terminal coupled to the second terminals of the first resistor and the second capacitor;
- a second amplifier having a voltage supply input, a reference input, a third input, and an output, the voltage supply input coupled to the reference supply terminal, the third input coupled to the output of the second amplifier and to the second terminal of the second resistor; and
- control circuitry having first and second inputs and an output, the first input coupled to the output of the transconductance amplifier, the second input coupled to the second transistor, and the output coupled to the input of the driver circuitry.

19. The voltage regulator of claim 18, wherein the control circuitry includes:
- a voltage to current converter having an input and an output, the input coupled to the output of the transconductance amplifier;
- sense circuitry having first, second, and third inputs and outputs, the first input coupled to the output of the voltage to current converter, the second input coupled to the first terminal of the second transistor, the third input coupled to the second terminal of the second transistor;
- a comparator having inputs and an output, the inputs coupled to the outputs of the sense circuitry; and
- a logic circuit having an input and an output, the input coupled to the output of the comparator, the output coupled to the input of the driver circuitry.

20. A voltage regulator comprising:
- a first transistor having first and second terminals and a control terminal, the first terminal coupled to an input voltage terminal;
- a second transistor having first and second terminals and a control terminal, the first terminal coupled to a reference supply terminal, the second terminal coupled to the second terminal of the first transistor;

an inductor having first and second terminals, the first terminal coupled to the second terminals of the first and second transistors, the second terminal coupled to an output voltage terminal;

a first capacitor having first and second terminals, the first terminal coupled to the second terminal of the inductor and to the output voltage terminal, the second terminal coupled to the reference supply terminal;

driver circuitry having an input and outputs, the outputs coupled to the control terminals of the first and second transistors;

a transconductance amplifier having a reference input, a second input, and an output, the second input coupled to the output voltage terminal;

a resistor having first and second terminals, the first terminal coupled to the output of the transconductance amplifier;

a second capacitor having first and second terminals, the first terminal coupled to the reference supply terminal, the second terminal coupled to the second terminal of the resistor;

a current source having first and second terminals, and a control terminal, the first terminal coupled to the second terminals of the resistor and the second capacitor, the second terminal coupled to the reference supply terminal;

a second amplifier having a reference input, a second input, and an output, the second input coupled to the output of the transconductance amplifier, the output coupled to the control terminal of the current source; and control circuitry having first and second inputs and an output, the first input coupled to the output of the transconductance amplifier, the second input coupled to the second transistor, and the output coupled to the input of the driver circuitry.

21. The voltage regulator of claim 20, wherein the control circuitry includes:

a voltage to current converter having an input and an output, the input coupled to the output of the transconductance amplifier;

sense circuitry having first, second, and third inputs and outputs, the first input coupled to the output of the voltage to current converter, the second input coupled to the first terminal of the second transistor, the third input coupled to the second terminal of the second transistor;

a comparator having inputs and an output, the inputs coupled to the outputs of the sense circuitry; and a logic circuit having an input and an output, the input coupled to the output of the comparator, the output coupled to the input of the driver circuitry.

* * * * *